United States Patent [19]
Reed

[11] Patent Number: 6,067,747
[45] Date of Patent: May 30, 2000

[54] PLANT GREENHOUSE FROST PROTECTOR AND GROWTH ENHANCER

[76] Inventor: George Reed, 1316 N. Riley Rd., Indianapolis, Ind. 46201

[21] Appl. No.: 09/252,074

[22] Filed: Feb. 18, 1999

[51] Int. Cl.[7] ............................ A01G 13/04; A01G 13/02
[52] U.S. Cl. ................................. 47/28.1; 47/26
[58] Field of Search ................................ 47/26, 28.1, 29, 47/30; 52/170

[56] References Cited

U.S. PATENT DOCUMENTS

| 2,004,396 | 6/1935 | Sage | 47/28.1 X |
| 2,063,822 | 12/1936 | Muller | 47/28.1 |
| 2,446,509 | 8/1948 | Fischer | 47/29 |
| 3,360,884 | 1/1968 | Budd | 47/28.1 |
| 3,384,992 | 5/1968 | Heffron | 47/29 |

FOREIGN PATENT DOCUMENTS

| 2 578 383 | 4/1984 | France | 47/27 |
| WO 98/34470 | 8/1998 | WIPO | 47/29 |

*Primary Examiner*—Michael J. Carone
*Assistant Examiner*—Jeffrey L Gellner

*Attorney, Agent, or Firm*—Patent & Trademark Services; Thomas Zack; Joseph H. McGlynn

[57] ABSTRACT

A plant greenhouse frost protector and growth enhancer for use with seedlings or young plants. The protector is frusto-conically shaped and made of a light transparent, semi-transparent or translucent transmitting plastic material. The protector's base has a series of ground engaging serrations with adjacent spaced slots. Prior to forming tabs, base slots normally extend upwardly towards the protector's top edge. Normally serrations hold the protector to the ground by the serrations in low wind conditions. In high wind conditions, tabs are formed by folding the base's areas between the slots outwardly and upwardly. These formed tabs form ground engaging surfaces parallel to the ground. The top edge of the protector is covered by a convex raised center top surface with slots that permit access to the interior formed cavity to water or ventilate the enclosed seedlings or plant. Flange engaging anchoring objects are disclosed including right angled pegs, dirt piled against the flange's top surface and rocks placed on the flanges. These pegs may engage the flange tabs by either placing them in the slots between the tabs or by penetrating through the tabs into the underlying ground.

7 Claims, 1 Drawing Sheet

PLANT GREENHOUSE FROST PROTECTOR AND GROWTH ENHANCER

BACKGROUND OF THE INVENTION

Devices for protecting seeds and new growing plants from the elements outdoors are well known. Conventional greenhouses are one of the best known examples. On a smaller scale, portable, reusable, transparent and translucent structures that enclose the protectable seed or plant have also be described in the prior art. In one example, a mini-greenhouse apparatus has a tapered transparent receptacle member with a lower collar anchor unit that fits over a lower lip element of the apparatus. The collar has ground penetrating downwardly depending spike elements that are angled slightly outwardly with respect to the collar element. A holed cap can also be mounted on the smaller end of the unit. Another protective device for growing plants is constructed of corrugated plastic material and folded in the form of a straight or tapered hexagonal column having two openable hinged lid panels. Still another seedling protector device consists of one or more shade tubes used to protect the plants from solar radiation. A support tube and ground engaging stake may be used to hold the protector in position about the plant. In a recent invention, the protective shell for the young plants is made from a resilient resin material formed by two substantially identical mating sections integrally formed with connecting snaps and selectively closable openings for air and irrigation purposes.

DESCRIPTION OF THE PRIOR ART

Devices for that are used to protect seedling or young plants from the weather are known. For example, in the Fujimoto invention (U.S. Pat. No. 4,711,051) a mini-greenhouse is disclosed having a tapered transparent receptacle member with a lower collar anchor unit that fits over a lower lip element of the apparatus. The collar has ground penetrating downwardly depending spike elements that are angled slightly outwardly with respect to the collar element. (column 3, lines 19–34). To allow for ventilation and irrigation, a holed cap can also be mounted on the smaller end of the unit.

The Stoll patent (U.S. Pat. No. 4,903,431) discloses a translucent plant cover constructed of corrugated plastic material and folded in the form of a straight or tapered hexagonal column having two openable hinged lid panels.

In U.S. Pat. No. 5,090,155 to Rodgers, the seedling protector consists of one or more shade tubes used to protect the plants from solar radiation. A support tube and ground engaging stake may be used to hold the protector in position about the plant.

The Johnston et al. reference (U.S. Pat. No. 5,605,008) discloses a plant shelter that consists of a protective shell made from resilient resin material formed by two substantially identical mating sections integrally formed with connecting snaps and selectively closable openings for air and irrigation purposes.

The present invention relates to a plant greenhouse frost protector and growth enhancer that is frusto-conical in shape and is made from transparent or translucent material having a lower ground engaging base. This base is formed with spaced serrations that may be used to hold the base to the earth. Alternately for high wind conditions, the base serrations may have vertically disposed slots placed between them which allow the base's lower edge to be folded. By folding these lower edge slotted portions out, at appropriately a right angle with respect to the adjacent vertical sides, a flange level with the adjacent ground is formed. To anchor the device in place on the ground, pegs, rocks or dirt may be placed on the extending flange as more fully described in this specification.

SUMMARY OF THE INVENTION

This invention relates weather protective device for a seedling or young plant that has a transparent or translucent outer surface with a serrated edged base that may also have a flanged edge that can be held to the ground in several different ways.

It is the primary object of the present invention to provide for an improved seedling or plant protector.

Another object is to provide for such a protector having a lower serrated edge coupled with a flanged edge that is parallel and level with the adjacent ground which flanged edge may be engaged by retaining objects.

These and other objects and advantages of the present invention will become apparent to readers from a consideration of the ensuing description and the accompanying drawings.

DESCRIPTION OF THE PREFERRED EMBODIMENT

Figure 1:
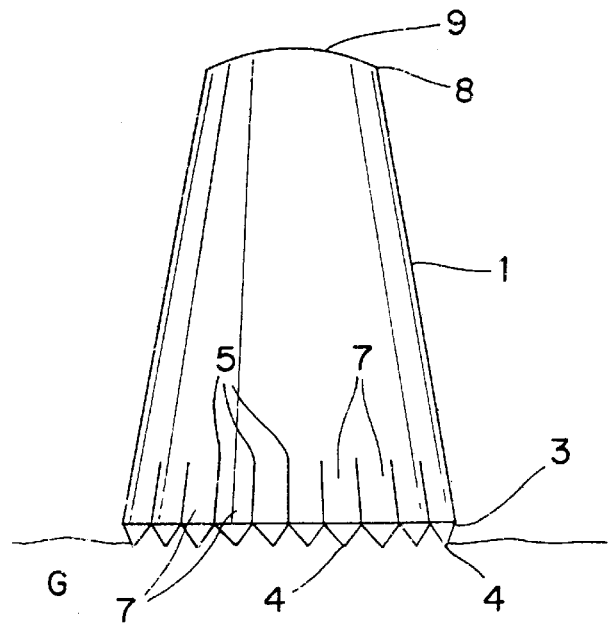
FIG. 1 is a side view of the invention's preferred embodiment before its lower serrated and flange edge has been folded outwardly.

FIG. 1 is a side view of the invention's preferred embodiment before its lower flange edge has been folded outwardly. The generally frusto-conical shaped protector 1 is made of a light transmitting material that may be transparent, semi-transparent or a translucent plastic material. The protector has a material thickness approximately that of a conventional milk bottle (0.040–0.060 inches). The wider lower base edge 3 has a series of equally spaced and equally shaped serrations 4 that extend completely around the base's edge. Between each adjacent serration 4 is a cut through slot 5. When the ground engaging serrations do not provide enough gripping force with the ground, such as in high wind conditions, they may be individually folded at their slots to form flanged tab edges 7 surfaces that extend around the base and upwardly therefrom. These formed tab edges 7 can be placed parallel to the ground. Conversely, when the ground is smooth and the wind conditions favorable, i.e. a light wind, the base's serrations are sufficient to retain the base to the ground without forming the tab edges 7.

The top protector edge 8 extends totally around the perimeter of the protector and is covered by the top surface 9. This top surface 9 is an upwardly curved convex surface with a raised center portion. Two through surface slots 11 intersect at the center of top covering surface 9 (see FIG. 2). The crossing slots 11 permit access from above to the enclosed inner protector cavity to ventilate or irrigate any seedlings or plants within the bottom of the protector's cavity.

Figure 2:
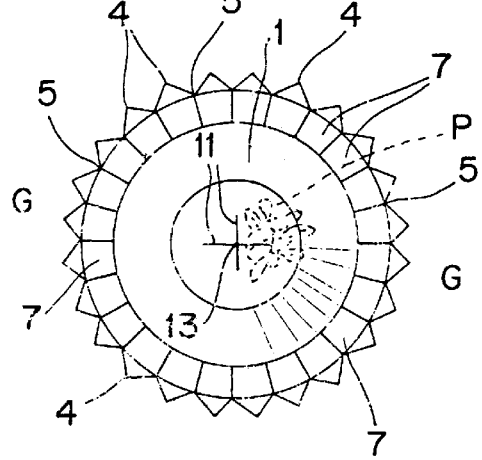
FIG. 2 is a top view of the of FIG. 1 embodiment after its lower flange edge has been folded outwardly.

FIG. 2 is a top view of the of FIG. 1 embodiment after the lower formed flanges or tab edges 7 have been individually folded at their slots 5 to the positions shown. Thereafter, the serrated edges 4 between each slot 5 extend outwardly from the protector 1. The bottom surfaces of these flange edges 7 are approximately parallel to and level with the surrounding ground G. The surrounding vertically disposed conical sides of protector 1, extend from each of the flange edges around the seedling or plant to be protected P, shown in dotted line format, to enclose the plant on all sides. The bottom or base of the protector is opened to the adjacent ground G on which it rests. The transparent or translucent plastic curved upper surface 9 is generally closed at the protector's top to the outside except for the two intersecting at right angle through slots 11. By folding back one or more of the four formed free edges 13 where the two slots 11 intersect, a user may obtain access to vent or water any lower plant or seedling P enclosed within the cavity formed by the sides of the outer protector 1 and its surface.

Figure 3:
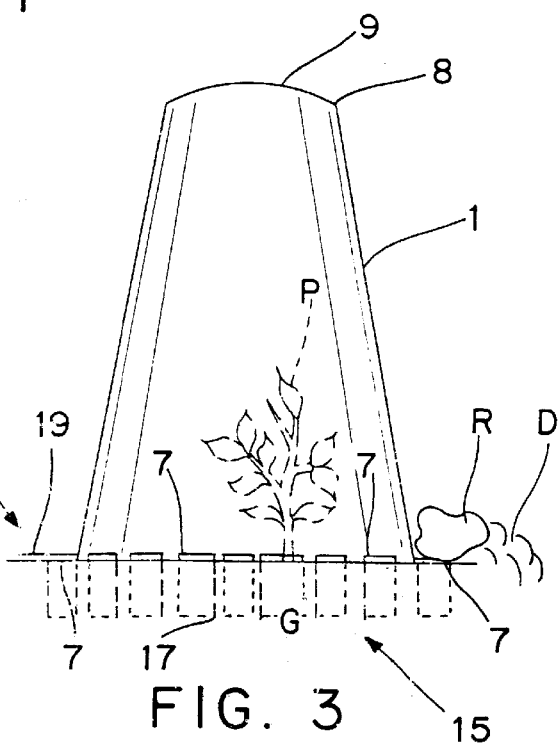
FIG. 3 is a slightly enlarged side view of the invention's preferred embodiment showing its lower flange edge folded outwardly to rest on the adjacent ground with various different retaining objects thereon.

FIG. 3 is a slightly enlarged side view of the invention's preferred embodiment (FIG. 1) showing its lower flange edges 7 folded outwardly to rest on the adjacent ground with various different retaining objects thereon. As stated before, the flanged edges are only used when high wind conditions are contemplated and normally when such conditions are not present, the ground engaging serrations 4 (see FIG. 1) are sufficient to hold the protective device 1 uprights without the flanged edges. Seven right angled pegs 15 that penetrate the ground G with their longer vertically disposed leg 17 (shown in dotted line format) are shown. The shorter peg leg 19 is horizontally disposed and rests over the upper surface of each of the extended formed flanges 7. The pegs may either fit within the formed slots 5 between each flange 7 or may have its vertical leg 17 penetrate through the material making up the flange 7. Alternately, the flanges 7 may be retained or anchored to the underlying ground G by using dirt D piled up over their surface around the lower flange edges or using hold down rocks R on the flanges both of which retaining objects are shown in dotted line format on the right most flange 7.

Figure 4:
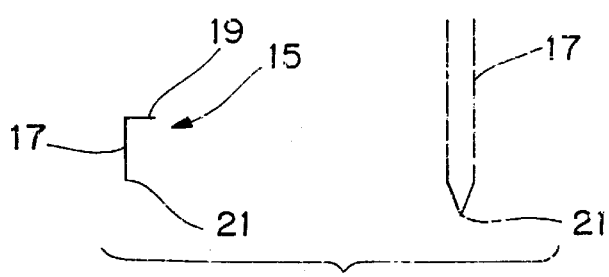
FIG. 4 is a side view of one of the peg retainers that can be used to engage the formed flange of the invention's preferred embodiment.

FIG. 4 is a side view of one of the peg retainers that can be used to engage one or more of the formed flanges or tabs 7 of the invention's preferred embodiment. Each peg has a longer vertically disposed leg 17 that engages the ground G and a shorter horizontally disposed leg 19 that rests on the upper flange surface of each tab 7. These two legs are oriented at a right angle with respect to each other and the lower free end of leg 17 may have a sharpened point 21 to permit the easy penetration of the earth or ground G.

In one working embodiment the protector P had a vertical height of 23 inches, a lower base diameter of 16 inches, an upper surface diameter of 8 inches, with each slot 5 having a length of 2 inches. Each of the slots 11 in the top surface 9 varied between 2 to 4 inches in total length while the pegs 15 has leg lengths of 4 inches (leg 17) and 2 inches (leg 19). Clearly, variations to these specific dimensions can vary to suit the specific needs of the user and the projected height and dimensions of the plants during the time they are to be protected.

In use, the seedling or plant P is first set in the ground as directed by the seed/plant supplier. Water is supplied to the set seedling or plant P. The edge serrations 4 are driven down into the earth to retain the device 1 to the ground. If high wind conditions are contemplated, the lower formed flanges 7 are bent or folded at about 90 degrees to face away from the main sides of the protector 1. Normally, the protector 1 is centered directly over seedling or plant P and lowered to enclose it on all sides and the top. Next, if there are formed flanges or tabs 7, they are anchored or retained to the underlying ground G by either using the peg 15, rocks placed on the flanges, or the piling of dirt against their upper surfaces.

When necessary other types of anchoring devices could also be used to retain the protector's flanged edges 7 to the ground to avoid the protector tipping over in high winds or other conditions. Included are bent coat hanger sections, large headed screw type devices whose vertical leg screw into the earth, large headed nails or spikes, and the like. However,to avoid the cost of these anchoring devices, the simple right angled peg anchor 15 was chosen as it can easily be made from wire lengths.

Although the preferred embodiment of the present invention and the method of using the same has been described in the foregoing specification with considerable details, it is to be understood that modifications may be made to the invention which do not exceed the scope oat the appended claims and modified forms of the present invention done by others skilled in the art to which the invention pertains will be considered infringements of this invention when those modified forms fall within the claimed scope of this invention.

What is claimed is:

1. A weather protective device for a seedling or plant comprising:

a frusto-conical shaped protector made of light transmitting material, said protector having a larger ground engaging base and a smaller top edge;

said ground engaging base having a lower edge with a plurality of spaced serrations and through slots between the serrations, said slots extending upwardly towards the top edge, said slots permitting the forming of a plurality of individual formed flange tabs between adjacent slots by folding the tabs outwardly and upwardly towards the protector's top edge; and anchoring means for engaging with said formed flange tabs to retain said protective device on the underlying ground.

2. The weather protective device as claimed in claim 1, wherein slots and serrations are spaced equally around the perimeter of said base.

3. The weather protective device as claimed in claim 2, also including a generally closed top protector surface extending across the protector's top edge and joined thereto.

4. The weather protective device as claimed in claim 3, wherein top protector surface is convex with a raised center portion.

5. The weather protective device as claimed in claim 4, wherein anchoring means engage able with said formed flange is an angled peg member having a longer leg and a shorter leg member.

6. The weather protective device as claimed in claim 4, wherein anchoring means engage able with said formed flange consists of a rock placed on the top surface of said formed flange tabs.

7. The weather protective device as claimed in claim 4, wherein anchoring means engage able with said formed flange consists of dirt piled up against the top surface of said formed flange tabs.

* * * * *